United States Patent
Hanz et al.

(10) Patent No.: US 8,868,758 B2
(45) Date of Patent: Oct. 21, 2014

(54) PROVIDER CONNECTION FRAMEWORK

(75) Inventors: Robert Hanz, Redmond, WA (US);
Daniel Thompson, Duvall, WA (US);
Ferry Susanto, Bellevue, WA (US);
Chien-Lung Yu, Bellevue, WA (US);
Abhinay Kampasi, Sammamish, WA (US); Michael K. Liptack, Monroe, WA (US); Dmitry Sonkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 12/773,018

(22) Filed: May 4, 2010

(65) Prior Publication Data

US 2011/0276696 A1 Nov. 10, 2011

(51) Int. Cl.
*G06F 15/16* (2006.01)
*G06F 15/173* (2006.01)

(52) U.S. Cl.
USPC .......................................... 709/227; 709/223

(58) Field of Classification Search
CPC ... H04L 63/20; H04L 2463/102; H04L 63/08; H04L 63/10
See application file for complete search history.

(56) References Cited

U.S. PATENT DOCUMENTS

| | | | |
|---|---|---|---|
| 2001/0003842 A1* | 6/2001 | Schaeck et al. | 713/169 |
| 2002/0062216 A1* | 5/2002 | Guenther et al. | 704/270.1 |
| 2002/0075844 A1* | 6/2002 | Hagen | 370/351 |
| 2002/0116511 A1* | 8/2002 | Boehme et al. | 709/230 |
| 2002/0169852 A1* | 11/2002 | Schaeck | 709/218 |
| 2003/0120829 A1 | 6/2003 | Avvari et al. | |
| 2003/0145053 A1 | 7/2003 | Bodin et al. | |
| 2003/0163513 A1* | 8/2003 | Schaeck et al. | 709/201 |
| 2005/0027871 A1* | 2/2005 | Bradley et al. | 709/227 |
| 2005/0131825 A1 | 6/2005 | Vijay | |
| 2005/0198332 A1* | 9/2005 | Laertz et al. | 709/229 |
| 2006/0212454 A1* | 9/2006 | Behl et al. | 707/10 |
| 2007/0174297 A1 | 7/2007 | Kim | |
| 2007/0239695 A1 | 10/2007 | Chakra et al. | |
| 2008/0127320 A1* | 5/2008 | De Lutiis et al. | 726/9 |
| 2009/0006578 A1 | 1/2009 | Schaeck | |
| 2010/0228836 A1* | 9/2010 | Lehtovirta et al. | 709/220 |

OTHER PUBLICATIONS

Oasis (Version 1.0, Sep. 3, 2003) Web Services for Remote Portlets Specification, pp. 6-8, 18-19, 42, 52, 63-64 and 79.*
Schaeck, Thomas., "Web Services for Remote Portals (WSRP) Whitepaper", Retrieved at << http://citeseerx.ist.psu.edu/viewdoc/download?doi=10.1.1.128.7570&rep=rep1&type=pdf >>, Sep. 22, 2002, pp. 1-18.

* cited by examiner

*Primary Examiner* — Peling Shaw
(74) *Attorney, Agent, or Firm* — Henry Gabryjelski; Kate Drakos; Micky Minhas

(57) ABSTRACT

A library of routines may serve as a connection point between multiple services. Each service may be a consumer or provider of data, and may be connected through the library using a registry service. The library may include a provider access mechanism through which provider services may transmit availability of an interface, as well as a consumer access mechanism through which an interface to be consumed may be transmitted. A registry service may match providers with consumers and facilitate communication between the two. The library may be configured to allow providers and consumers to be added or removed at any time.

20 Claims, 3 Drawing Sheets

PROVIDER CONNECTION FRAMEWORK

BACKGROUND

Devices and services that interact with each other often have dependencies, where one service may depend on another service for an input. In many cases, such services may be started in a specific sequence so that the dependencies may be satisfied. Once the services are operating, adding or removing services may be difficult to perform without restarting the entire system.

SUMMARY

A library of routines may serve as a connection point between multiple services. Each service may be a consumer or provider of data, and may be connected through the library using a registry service. The library may include a provider access mechanism through which provider services may transmit availability of an interface, as well as a consumer access mechanism through which an interface to be consumed may be transmitted. A registry service may match providers with consumers and facilitate communication between the two. The library may be configured to allow providers and consumers to be added or removed at any time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
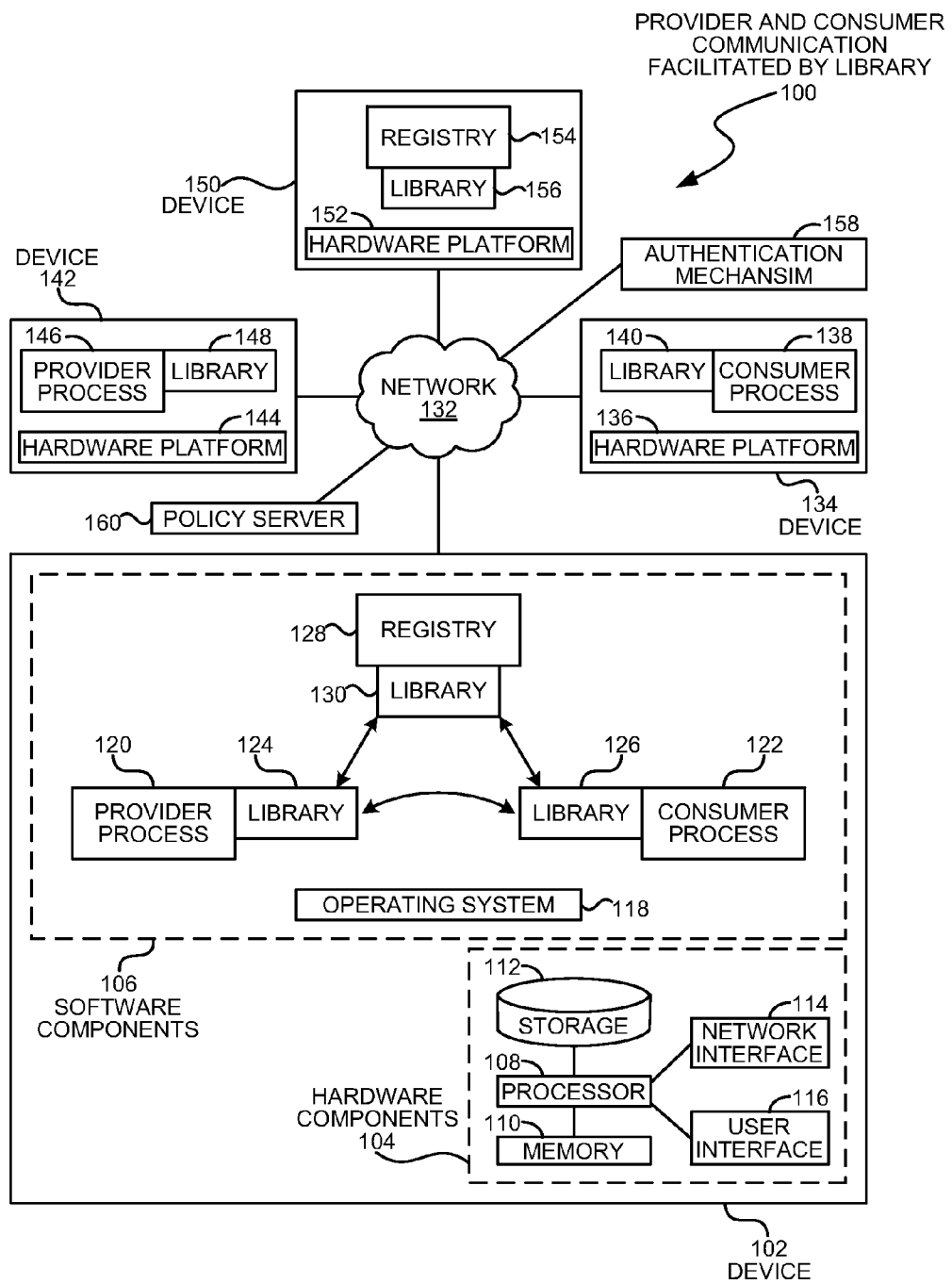
FIG. 1 is a diagram illustration of an embodiment showing a system with a registry based matching system for consumer and provider processes.

A library of routines may facilitate communications between provider processes and consumer processes using a registry service. Each consumer process may link to a consumer library that may establish connections to the registry service and request certain interfaces. Similarly, each provider process may link to a provider library that may establish connections to the registry service and make certain interfaces available. The registry service may match provider processes with consumer processes and transmit communication information to the respective provider library and consumer library, which may establish a third communication path and bind objects from the consumer process to corresponding objects in the provider process.

The library may handle all communications between provider processes and consumer processes, including establishing connections to the registry service as well as direct communications between the matched provider and consumer processes.

By using the library and registry service, provider and consumer processes may be brought online in a random sequence, and may be added or removed once communications are established. The library and registry service may allow complex systems, such as network applications, to be started and managed without complex sequencing during startup, and may allow network services to be added or removed as the network application is operating.

The library may allow programs to be written in an object oriented form and linked together through the registry service. In some embodiments, the provider and consumer processes, as well as the registry service, may all operate on different hardware platforms and may be connected through a network. In other embodiments, the provider and consumer processes and the registry service may reside on a single device. Each program may identify objects that it may consume as well as objects that it may provide, and such objects may be defined by an interface.

An interface may be a contract or definition of the classes, objects, methods, or other components that may be provided through an interface. A consumer process may request one or more components that conform to the interface, and a binding may be established between the requested object and the provider process. The provider process may provide the object that may be consumed by the consumer process when the consumer process calls the object.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system with provider and consumer communication facilitated by a library. Embodiment 100 is a simplified example of a device in which provider and consumer processes may be bound together using a registry service, where each of the processes may link to a library of routines that facilitate the communication and binding.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a hardware platform and network environment in which provider processes and consumer processes may be matched and bound together using a library. The respective processes may link to the library and the library may handle the various communications and binding.

The library may enable a programming architecture where processes merely define their dependencies using interfaces and objects conforming to the interfaces. Processes that may provide object may make those objects known according to the interfaces. Once the associations with the interfaces are defined, the library in association with the registry service may handle all of the communications, handshaking, matching, and other activities.

By using the library, a programmer may create an application or process that may handle objects relating to an interface and the library may perform much of the complexities of orchestrating the processes together. In many large scale applications, applications or services may depend on other applications and services. In order to develop and test such large scale applications, individual processes may be created and tested against an interface during development. During integration testing, the processes may be combined using the library to operate as a large scale application.

The library and registry service may be used to combine processes within a single device, such as device 102. In such an embodiment, the various processes may advertise the interfaces for which the process may provide or consume, and those processes may be bound together using the library. In another embodiment, the library may be used to join processes or applications operating on different devices.

The library and registry service may allow changes to be made to a system while the system is in operation. For example, a consumer process may be halted and replaced with a new consumer process. Similarly, a provider process may be halted and restarted without causing a consumer process to crash. In another example, a new consumer process may be added to the system and establish relationships with one or more provider processes.

The device 102 may represent a typical computer device, such as a desktop computer or server, having hardware components 104 and software components 106. In some embodiments, the device 102 may be a laptop computer, netbook computer, tablet computer, mobile telephone, handheld personal digital assistant, game console, network appliance, or any other computing device.

The architecture illustrated for device 102 may represent a typical architecture with hardware and software components; however, other architectures may be used to implement some or all of the distributed database system.

The hardware components 104 may include a processor 108, random access memory 110, and nonvolatile storage 112. The hardware components 104 may also include a network interface 114 and a user interface 116.

The software components 106 may include an operating system 118 on which various applications may execute, including a provider process 120 and consumer process 122. The provider process 120 may provide objects according to an interface, and the consumer process 122 may consume the objects.

For the purposes of this specification and claims, an interface may refer to a set of named operations that may be invoked by a consumer process. An interface may refer to an abstraction that a provider process may provide of itself to other processes. An interface may separate the method of external communication from internal operation. The external communication may refer to communication with other processes while internal operation may refer to the internal mechanism for performing any action.

An interface may be considered a contract that defines how a consumer process may interact with a provider process. When the interface is well defined, different provider processes may be interchanged and still provide objects for a consumer process.

In used with an object oriented language, the interface may define an abstract type that contains no data but may expose behaviors as methods. A class having all of the method corresponding to an interface may be said to implement the interface.

The libraries 124 and 126 may be linked to the provider process 120 and consumer process 122, respectively. The linking may be performed at compile time by a compiler or at runtime by a runtime linker. In many embodiments, the libraries 124 and 126 may be dynamic linked libraries or shared libraries.

A registry 128 may be a service that manages the various provider and consumer processes. The registry may receive communications from provider processes and consumer processes that advertise an interface and match one or more provider processes with one or more consumer processes for each given interface.

In some cases, a provider service may advertise an interface for which a consumer process may not be available. Similarly, a consumer process may advertise an interface for which a provider process may not be available. During the period of time that a process does not have a match, the process may operate normally. During such time, the process may be idle or may be performing other actions.

In some cases, the registry 128 may not be functioning or may not be available when one of the provider process 120 or consumer process 122 is operational. During such time, the respective libraries 124 and 126 may perform repeated retries to attempt to connect to the registry 128. For example, the library 124 may attempt to locate the registry 128 using a Uniform Resource Identifier (URI) or other address mechanism. If the communication is not established, the library 124 may perform a retry of the same URI. In some embodiments, the library 124 may attempt to connect using a second method or second address.

When a corresponding provider and consumer process may be identified by the registry 128, the registry 128 may transmit communications to the respective libraries 124 and 126 so that the libraries may establish communication between themselves.

The libraries 124 and 126 may establish direct communication between themselves when implementing an interface. The libraries may receive communication information from the registry 128 that may identify an address for the corresponding library as well as additional information that may be used to create a connection. The additional information may include protocols, addresses, proxies, port designators, and other information.

In some embodiments, each process may present authentication credentials when establishing a connection with a registry. The authentication credentials may define a set of user credentials, device credentials, process credentials, or other identifiers. The authentication credentials may be used by the registry to match a provider process with a consumer process based on access policies established for each process.

For example, a consumer process may be permitted access to only certain provider processes based on the specific user, device, process, or other identifiers. A registry may match such a consumer process with a provider process for which the consumer process may be permitted access.

In some embodiments, a policy may define which types of consumer processes may receive data from a specific provider. For example, a provider process may have sensitive information that may be consumed by processes that may be associated with a certain class of users.

The policy may be defined by each process separately and provided to the registry for matching. For example, a provider process may transmit information to the registry that includes an interface as well as a policy to be applied to the interface. The policy may define, for example, which users, devices, or processes may have access to the interface and what types of credentials may be accepted. The registry may match the provider's interface with that of a consumer process that supplies proper credentials.

A process may be both a provider and consumer in some instances. In some such instances, the process may both provide and consume the same interface. Such instances may be useful when other consumer processes may be available to consume the objects provided by the provider portion of the process.

The libraries 124 and 126 may be identical in some embodiments. In such embodiments, the libraries 124 and 126 may allow either the provider process 120 or the consumer process 122 to act as either providers or consumers. In other embodiments, separate libraries may be created for provider processes and consumer processes.

In some embodiments, the registry 128 may have a library 130 that may communicate with the libraries 124 and 126. The library 130 may be a copy of the libraries 124 and 126 in some embodiments, or may be a different version of the library specific for a registry service. In some embodiments, the functions of the library 130 may be integrated with the registry 128.

The components of device 102 may represent an embodiment where the provider and consumer processes, as well as the registry, are located within the same device. Such an embodiment may be useful in an application where several independent processes may work together to form an application.

In other embodiments, the same concepts and mechanisms may apply to applications that may be distributed across a network 132. For example, a device 134 may contain a hardware platform 136 and may operate a consumer process 138 with a linked library 140. Device 142 may also have a hardware platform 144 on which a provider process 146 may execute along with a library 148. A third device 150 may have another hardware platform 152 on which a registry 154 with a library 156 may execute.

The hardware platforms 136, 144, and 152 may contain similar hardware components as the hardware components 104 for device 102. The network 132 may represent a local area network or a wide area network, such as the Internet. In some cases, the network 132 may be a tightly coupled or restricted access network, such as a storage area network or other architecture.

The devices 134, 142, and 154 may represent an embodiment where each of the consumer and provider processes, as well as the registry, may be located on different hardware platforms. In such an embodiment, each device may operate as a provider or consumer and may advertise to the registry, then receive communication information to enable the libraries to communicate and bind objects based on the interface.

In some such embodiments, many different consumer and provider devices may be joined together to form a large scale application or groups of applications.

One example of such an embodiment may be in the management systems of a local area network. A first device may provide email and messaging services and may be interdependent on another device that may provide authentication and management services. In such an embodiment, the email and messaging device may advertise that it may consume authentication services through an authentication interface and may provide email services through an email interface. The second device may advertise that it may consume portions of an email interface and may provide the authentication interface. As the two devices come online, the various services may make their advertisements known to the registry 154, which may match the interfaces together and enable the services to communicate with each other.

In some embodiments, a registry may use an authentication mechanism 158 and policies from a policy server 160 to permit consumers and providers to communicate. In some such embodiments, the consumers and providers may provide credentials that may be verified by an authentication mechanism 158 at the time the processes advertise with the registry.

In some embodiments, an authentication mechanism 158 may be used when a consumer and provider process are being connected and bound. During such a process, the consumer and provider may mutually authenticate each other using credentials provided by the registry.

In one such embodiment, a Globally Unique Identifier (GUID) or other key may be passed from the registry to the consumer and provider. When the consumer and provider establish communications, the key may be exchanged to authenticate each process to the other.

In another such embodiment, the consumer and provider may each separately authenticate against an authentication mechanism and receive a token as part of establishing a communication session. The tokens may be exchanged and each process may verify the token received from the other.

In still another such embodiment, the registry may provide encryption keys to the consumer and provider as part of the communication information. The encryption keys may be used to encrypt or decrypt information passed from one library to another and thereby authenticate each other.

A set of policies defined in a policy server 160 may be enforced between a consumer and provider. The policies may define access privileges for consumer or provider processes based on the user, device, process, or other parameters. A policy may be defined that gives access to specific users or groups of users, for example. Such a policy may permit or deny access for a process associated with a user, and may be applied to either or both of the consumer or provider process. Similarly, policies may be defined that permits or denies access to specific devices or types of devices, or for specific processes or types of processes.

Figure 2:
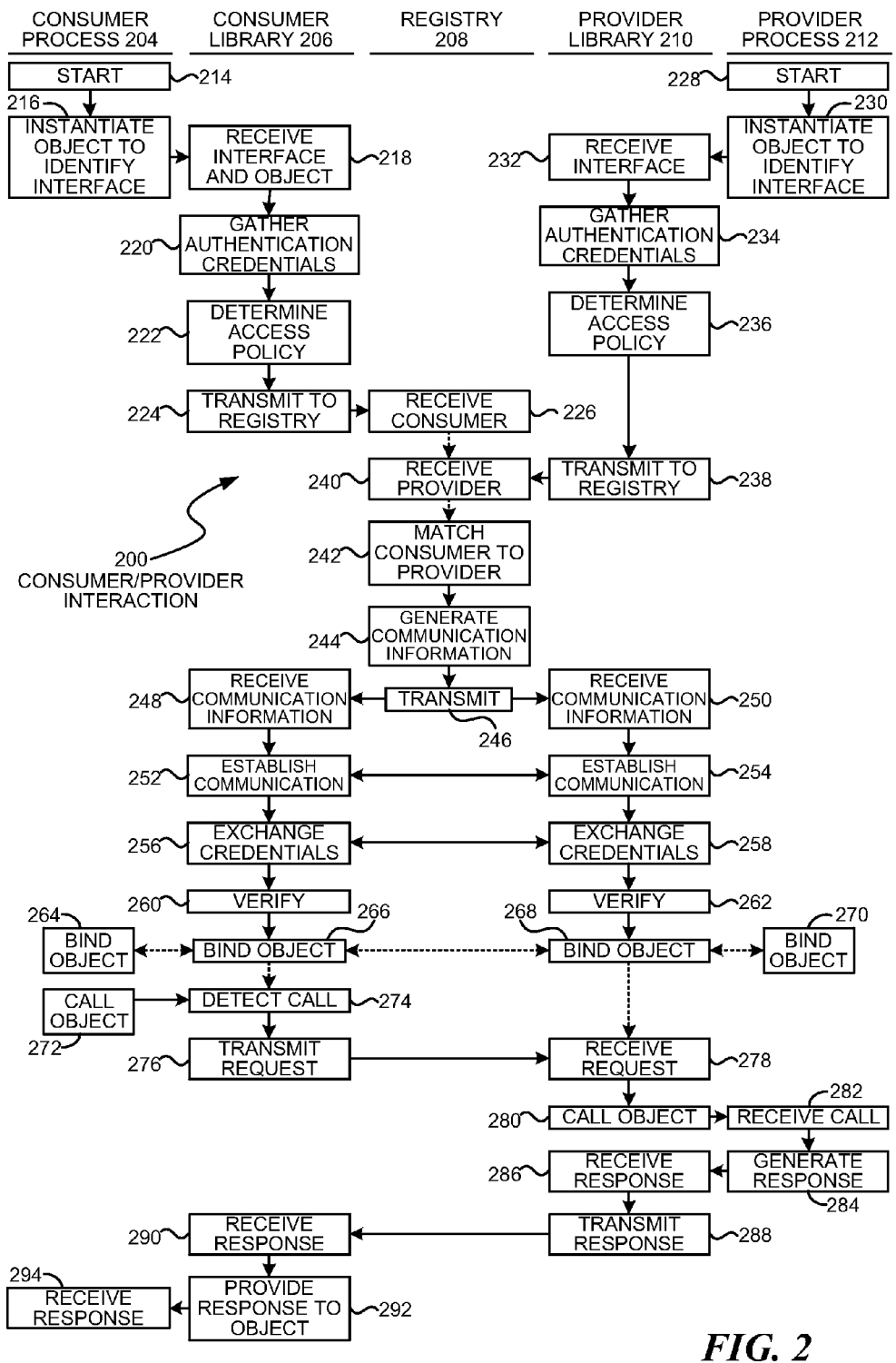
FIG. 2 is a timeline illustration of an embodiment showing a method for matching and interacting between consumer and provider processes.

FIG. 2 is a timeline illustration of an embodiment 200 showing the actions and interactions of a consumer process 204, a library 206 associated with the consumer process 204, a registry 208, a provider process 212, and a library 210 associated with the provider process 212. Embodiment 200 may illustrate some of the actions performed by the components as described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 may illustrate the actions and interactions between libraries 206 and 210 in combination with a registry 208 to provide connectivity and binding between a consumer process 204 and provider process 212. In some embodiments, all of the components may reside on a single device and operate on a single processor, such components being the consumer process 204, consumer library 206, registry 208, provider library 210, and provider process 212. In other embodiments, one or more of the components may be located on a remote device.

The consumer process 204 may be any process that may consume an object defined in an interface. The consumer process 204 may be any type of application, process, thread, or other executable component. Similarly, the provider process 212 may be any process that may implement an interface and provide objects defined in the interface. The provider process 212 may also be any type of application, process, thread, or other executable component.

The consumer library 206 and provider library 210 may be libraries that are callable by the respective consumer process 204 and provider process 212. The libraries may be linked to the processes at compile time or runtime and may be implemented as shared libraries or dynamic linked libraries. In such embodiments, the libraries may execute on the same device as the respective processes.

The registry 208 may perform matchmaking between the consumer process 204 and provider process 212. The matchmaking process may identify a provider process that implements an interface with a consumer process that requests the interface.

The matchmaking process may also consider various policies when determining a match. In some cases, a process may have access restrictions that may permit or deny access to other processes based on the process's associated properties, such as a user, device, or other process.

The consumer process 204 may start in block 214.

During execution, the consumer process 204 may instantiate an object within an interface. The instantiation may refer to the consumer library 206 as a source for the object, and the consumer library 206 may receive the interface and object in block 218.

The consumer library 206 may gather authentication credentials in block 220 and determine an access policy in block 222. The interface, credentials, and access policy may be transmitted to the registry 208 in block 224 and received by the registry 208 in block 226.

Similarly, the provider process 212 may begin in block 228 and instantiate an object to identify an interface in block 230. The instantiation may refer to the provider library 210. The provider library 210 may receive the interface and object in block 232 and gather authentication credentials in block 234 and determine an access policy in block 236. The interface, credentials, and access policy may be transmitted to the registry in 208 in block 238 and received by the registry in block 240.

The registry 208 may match the consumer process 204 to the provider process 212 in block 242.

The registry 208 may determine a match by first matching the interface defined by the consumer process 204 with the interface defined by the provider process 212.

In some embodiments, the matching process may consider access policies to determine an appropriate match. The access policies may be used to verify that a provider process may be permitted to provide to a consumer process, and also verify that a consumer process may be permitted to receive information from a provider process.

Some embodiments of a registry 208 may authenticate the consumer process 204 and provider process 212 prior to performing any matching. In such embodiments, the credentials provided by the respective processes may be passed to an authentication mechanism to verify the respective process's identity.

Once the match is performed in block 242, communication information may be generated in block 244 and transmitted in block 246 to the respective libraries. The consumer library 206 may receive the communication information in block 248 and the provider library 210 may receive the communication information in block 250. In some embodiments, the registry 208 may transmit the communication information to either the consumer library 206 or provider library 210.

The communication information may be information used by the respective libraries to establish communications. In some cases, the same set of communication information may be provided to each library, while in other cases, one set of communication information may be provided to the consumer library 206 and another set of communication information may be provided to the provider library 210.

The communication information may define various communication parameters that may be used to communicate between the libraries. Such parameters may include an address for the other library. In some cases, the address may be an Internet Protocol (IP) address, which may include a port number. In other cases, the address may be a Uniform Resource Identifier (URI) or other address.

The communication information may also include other parameters, such as protocol definitions, proxy addresses, communication speeds, error checking mechanisms, or other information that may be used to configure a communications session. Such information may also include security parameters, such as encryption mechanisms, encryption keys, or other parameters used to secure communications between the libraries.

Authentication information may be supplied to the libraries and used to authenticate each library to the other when establishing a communication session. In some embodiments, the authentication provided by the libraries to the registry may be sufficient and no further authentication may be performed. In other embodiments, the authentication may be performed with the registry 208 and again between each library. In still other embodiments, the authentication may not be performed with the registry but may be performed between the libraries.

The libraries 206 and 210 may establish communication in blocks 252 and 254, and then exchange credentials in blocks 256 and 258. After exchanging credentials in block 256, the consumer library 206 may verify the credentials in block 260, and similarly the provider library 210 may verify the credentials in block 262.

Once the credentials are verified, the consumer process 204 may bind to the consumer library 206 in blocks 264 and 266, and the provider process 212 may bind to the provider library 210 in blocks 270 and 268. The communication path between the libraries may create a binding between blocks 266 and 268, forming a binding chain between the consumer process 204 and the provider process 212.

Once the binding is established, operation between the consumer process 204 and provider process 212 may happen.

The consumer process 204 may call an object in block 272 and the consumer library 206 may detect the call in block 274. After detecting the call, the consumer library 206 may transmit a request in block 276 to the provider library 210, which may receive the request in block 278.

Using the binding established between blocks 268 and 207, the provider library 210 may call the object in block 280, and the provider process 212 may receive the call in block 282.

The provider process 212 may generate a response to the call in block 284, which may be received by the provider library 210 in block 286. The response may be transmitted by the provider library 210 in block 288 and received in block 290 by the consumer library 206. The consumer library 206 may provide the response to the object in block 292, which may be received by the consumer process 204 in block 294.

Embodiment 200 represents a simplified example of a method to advertise an interface, match a consumer process to a provider process, and perform some interaction between the processes after establishing a communication session.

Figure 3:
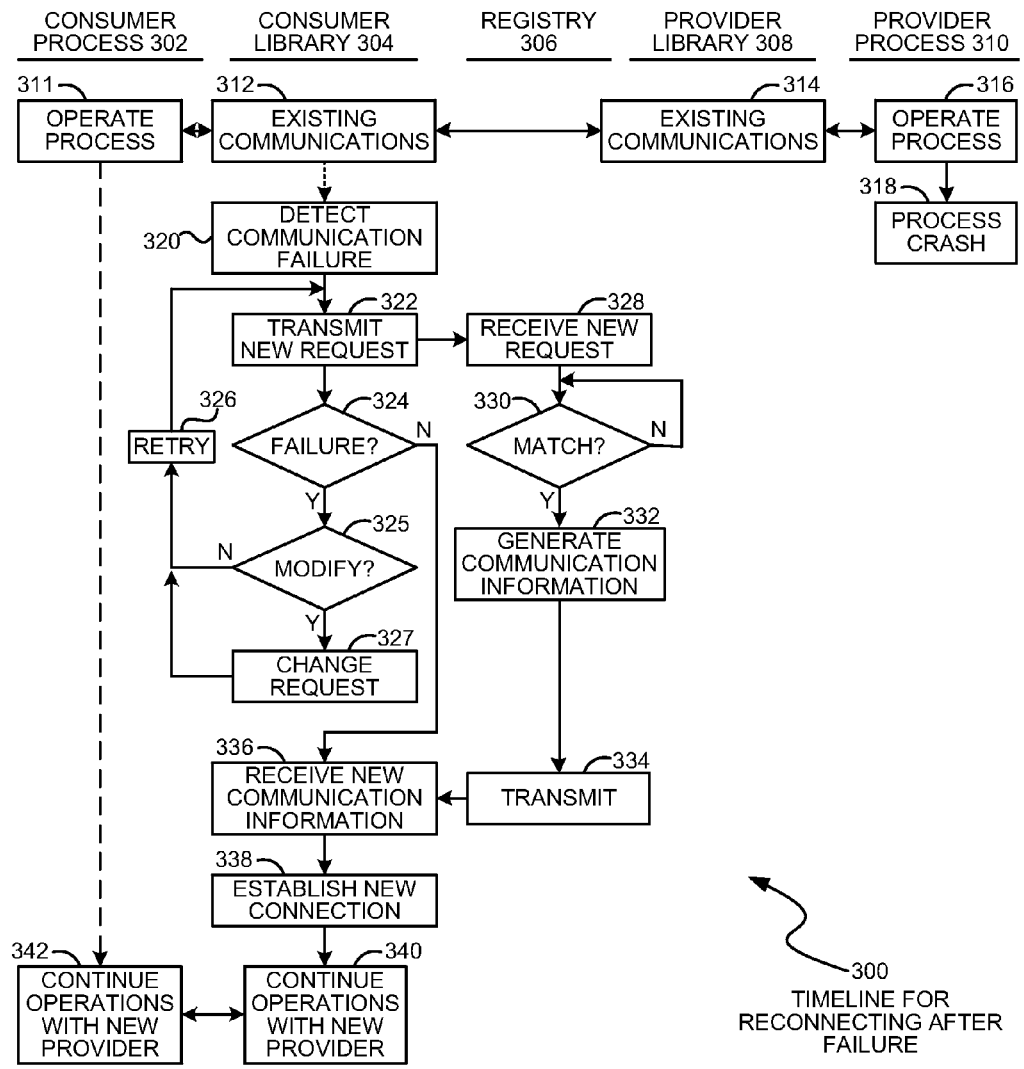
FIG. 3 is a timeline illustration of an embodiment showing a method for reestablishing communications after a failure.

FIG. 3 is a timeline illustration of an embodiment 300 showing the actions and interactions of a consumer process 304, a library 304 associated with the consumer process 304, a registry 308, a provider process 310, and a library 308 associated with the provider process 310. Embodiment 300 may illustrate some of the actions performed by the components as described in embodiment 100, and specifically actions that may be performed when a failure may be detected in a communication path. The processes, libraries, and registry of embodiment 300 may correspond with the respective components of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may illustrate an example of a recovery mechanism that may be used when a connection to a provider process may be lost. When a communication failure may be detected, a consumer library may transmit a new request to a registry and may receive a new provider. Once the new provider is located, a new connection may be established to the new provider and operations may continue.

Additionally, embodiment 300 may illustrate a retry mechanism that a library may use while attempting to connect to the registry. The retry mechanism may modify a request or may retry the same request until a communication is established with the registry.

In some embodiments, a library may use a similar retry mechanism when a communication failure may be detected between two libraries.

In block 311, a consumer process 302 may operate and may communicate with a consumer library 304 using existing communications in block 312. The consumer library 304 may be in communication with a provider library 308 using existing communications in block 314 while the provider process 310 operates normally in block 316. The state of blocks 311 through 316 may represent an established communications session between the consumer process 302 and the provider process 310, such as was described in embodiment 200.

In block 318, the provider process may crash or become unavailable. The crash may be an unintentional or intentional stoppage of services. The crash may be detected by the consumer library 304 in block 320.

In some embodiments, the consumer library 304 may attempt to reestablish communications repeatedly before determining that the communication failure has occurred. In some such embodiments, a library may have two or more different manners in which the library may establish communications with another library. For example, an alternate IP address or URI may be attempted, or the communications protocol may be changed for another attempt. The detection in block 320 may be the result of multiple attempts that have failed.

After detecting a failed communication in block 320, a new request may be created and attempted to be transmitted in block 322. If a failure were to occur in block 324, a retry may be attempted. If the attempt may be modified in block 325, the request may be changed in block 327 and retried in block 326. If the attempt may not be modified in block 325, the retry may be attempted in block 326.

In some embodiments, alternative addresses, communication protocols, or other modifications may be made to the request of block 322. After retrying the request, the registry 306 may receive the request in block 328.

The registry 306 may not have a match in block 330 and may loop back to block 330 until a match is found. When a match is found, communication information may be generated in block 332 and transmitted in block 334 to the consumer library.

In some cases, the communication information may be for a new provider which may be different from the provider process 310. In some cases, the communication information may be for the same provider process 310 when the provider process 310 comes back online.

The consumer library 304 may receive new communication information in block 336, establish new connection in block 338, and continue operations with a new provider in block 340.

During the period of time from block 311 to block 342, the consumer process 302 may be bound to the consumer library 304. When the consumer library 304 establishes a new connection to a provider process, the binding may be continued to the new provider process. This mechanism may allow the provider process to be removed and replaced without affecting the consumer process 302.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   system memory;
   one or more processors; and
   one or more computer storage devices having stored thereon computer-executable instructions representing a provider service, a consumer service, and a registry service,
   wherein said provider service is configured to:
      connect to a first library comprising communication processes;
      identify an interface that said provider service implements; and
      cause an indication of said interface and one or more of: provider authentication credentials and a provider access policy to be communicated from said first library to said registry service;
   wherein said consumer service is configured to:
      connect to second library comprising communication processes;
      identify said interface as being requested by said consumer;
      define an object compliant with said interface and consumed by a routine in said consumer service;
      cause a further indication of said interface and one or more of: consumer authentication credentials and a consumer access policy be communicated from said second library to said registry service; and
   wherein said registry service is configured to:
      receive said communication from said first library;
      receive said communication from said second library;
      match said consumer service and said provider service based on said indication, said further indication, and one or more of: said provider authentication credentials, said provider access policy, said consumer authentication credentials, and said consumer access policy; and
      bind said object from said consumer service to said provider service.

2. The system of claim 1, said first library configured to:
   attempt to connect to said registry service to determine that said registry service is not available and retries said attempt to connect.

3. The system of claim 2, said second library configured to:
   attempt to connect to said registry service to determine that said registry service is not available and retries said attempt to connect.

4. The system of claim 3, said provider service connecting to said first library by linking said first library as a dynamic linked library.

5. The system of claim 4, said provider service being located on a first device and said consumer service being located on a second device.

6. The system of claim 4, said provider service being located on a first device and said consumer service being located on said first device.

7. The system of claim 4, said provider service being a first process in an application and said consumer service being a second process in said application, said application being performed on a first device.

8. The system of claim 7, said registry service being located on a second device.

9. The system of claim 1, said communication from said first library to said registry service comprising a URI for said first library.

10. The system of claim 1, said communication from said first library to said registry service being established using an authentication mechanism.

11. An object oriented programming environment, said environment comprising:
    one or more processors;
    system memory; and
    one or more computer storage devices having stored thereon computer-executable instructions representing a library of objects and a registry service,
    said library of objects comprising:
       a consumer object callable by a consumer process, said consumer object configured to indicate consumer authentication credentials and a consumer access policy to said registry service; and
       a provider object callable by a provider process, said provider object configured to indicate provider authentication credentials and a provider access policy to said registry service; and
       wherein said registry service transmits communication information enabling said consumer object and said provider object to create a connection binding said provider process and said consumer process based on said consumer authentication credentials, said consumer access policy, said provider authentication credentials, and said provider access policy.

12. The environment of claim 11, said communication information being transmitted to said consumer object.

13. The environment of claim 11, said communication information being transmitted to said provider object.

14. The environment of claim 11, said registry service being operated on a second computer processor selected from among the one or more processors.

15. The environment of claim 11, said consumer object and said provider object being capable of attempting to establish a connection to said registry, determining that said registry is unavailable, and retrying to establish said connection to said registry.

16. The environment of claim 11, said registry service that further:
   detects that communication with said consumer object is broken and transmits a message to said consumer object based on said detecting.

17. The environment of claim 11, further comprising a linker, said linker being a dynamic linker that combines objects at execution time.

18. At a computer system, the computer system including one or more processors and system memory, a method for linking a provider process and a consumer process, the method comprising:
   receiving a first transmission from said provider process, said first transmission including an indication of an interface and one or more of: provider authentication credentials and a provider access policy;
   receiving a second transmission from said consumer process, said second transmission including a further indication of said interface, an object compliant with said interface, and one or more of: consumer authentication credentials and a consumer access policy;
   a processor matching said consumer process and said provider process based on said indication, said further indication, and one or more of: said provider authentication credentials, said provider access policy, said consumer authentication credentials, and said consumer access policy; and
   binding said compliant object from said consumer service to said provider service.

19. The method of claim 18, wherein said provider process and said consumer process are located at said computer system.

20. The method of claim 18, wherein matching said consumer process and said provider process comprises a registry service matching said consumer process and said provider process.

* * * * *